(12) United States Patent
Iacocca et al.

(10) Patent No.: US 6,436,470 B1
(45) Date of Patent: Aug. 20, 2002

(54) METHOD OF APPLYING A HARD-FACING MATERIAL TO A SUBSTRATE

(75) Inventors: Ronald G. Iacocca; Karthik Sivaraman; Anand Lal; Randall M. German, all of State College, PA (US)

(73) Assignee: Penn State Research Foundation, University Park, PA (US)

( * ) Notice: Subject to any disclaimer, the term of this patent is extended or adjusted under 35 U.S.C. 154(b) by 0 days.

(21) Appl. No.: 09/647,842

(22) PCT Filed: Apr. 22, 1999

(86) PCT No.: PCT/US99/08498

§ 371 (c)(1),
(2), (4) Date: Feb. 22, 2001

(87) PCT Pub. No.: WO99/55470

PCT Pub. Date: Nov. 4, 1999

Related U.S. Application Data

(60) Provisional application No. 60/083,059, filed on Apr. 25, 1998.

(51) Int. Cl.[7] .................................................. B05D 1/12
(52) U.S. Cl. ..................... 427/201; 427/180; 427/295; 427/374.4; 427/427; 427/429; 427/435
(58) Field of Search .............................. 427/180, 190, 427/201, 295, 327, 560, 427, 429, 435, 374.4, 376.3, 376.4, 380, 397.7

(56) References Cited

U.S. PATENT DOCUMENTS

| | | | |
|---|---|---|---|
| 4,643,740 A | * | 2/1987 | Nicolson |
| 4,725,509 A | * | 2/1988 | Ryan |
| 4,726,101 A | * | 2/1988 | Draghi et al. |
| 5,271,547 A | * | 12/1993 | Carlson |
| 5,549,927 A | * | 8/1996 | Cottone et al. |
| 6,210,812 B1 | * | 4/2001 | Hasz et al. |

FOREIGN PATENT DOCUMENTS

GB 2 108 534 * 5/1983

OTHER PUBLICATIONS

"Powder Coating; The Complete Finisher's Handbook", Nicholas P. Liberto, Ed., pp. 314–315, 1994.*

* cited by examiner

Primary Examiner—Fred J. Parker
(74) Attorney, Agent, or Firm—Phillips, Lytle, Hitchcock, Blaine & Huber LLP

(57) ABSTRACT

An improved method of applying a particulate material to a substrate, includes the steps of: removing impurities from a surface of the substrate; forming a coating composition having a bonding material and at least one particulate material; applying the coating composition to the substrate surface; and creating a diffusion bond between the substrate, bonding material and particulate material for generating a continuous interface between the substrate surface and particulate material such that the change in mechanical properties between the substrate and particulate material occurs in a direction normal to the plane of the substrate surface, thereby minimizing residual strain and coefficient of thermal expansion mismatch between the substrate and particulate material, the surfaces of individual particles of said particulate material being chemically wetted by the bonding material. The particulate material and the bonding material comprise a layer on the substrate surface.

24 Claims, 13 Drawing Sheets

Tungsten Carbide Tape Cast Sheet Production

Cleaning Procedure for Inconel

METHOD OF APPLYING A HARD-FACING MATERIAL TO A SUBSTRATE

CROSS-REFERENCE TO RELATED APPLICATION

This application claims the benefit of U.S. Provisional Application Ser. No. 60/083,059, filed on Apr. 25, 1998.

TECHNICAL FIELD

The present invention relates generally to hard-facing coatings, and, more particularly, to an improved method for applying a coating layer to a substrate.

BACKGROUND ART

The life and reliability of hydraulic cylinders often depends on having a hardened wear coating on the interior surface of the cylinder bore. This coating provides wear resistance and a bearing capability for the piston head and seal. The piston rod can experience significant side loads during use, often causing a dynamic metal-to-metal contact between the bore wall and the piston head. In addition, abrasive particles accumulate in the piston seal. After millions of inches of piston travel, these entrained particles can dramatically degrade the bore finish, which contributes to increased internal leakage and accelerated wear. By providing a protective hardened coating on the bore wall, the life of the actuator can be dramatically increased.

The common way to provide such a hardened coating is to electrolytically deposit chrome on the cylinder bores. Although chrome provides the desired mechanical wear properties, there are a number of problems attendant its use. First, the electroplating process creates hydrogen embrittlement of the substrate, which reduces the fatigue strength of the faced material. Second, the added wall thicknesses required to reduce stress levels to the point of affording the required life, can add significant weight to the part. Third, chrome processing is recognized to provide an environmental hazard. In the United States, the Environmental Protection Agency is tightening controls on wastestream treatment at plating houses. This has resulted in increased plating costs. The government has also initiated activities aimed at developing alternative coating materials. Fourth, the use of chrome plating represents a significant recurring cost for the actuator manufacturer. Because the coating is not applied uniformly, a build-up of chrome can provide an excessive thickness, particularly on edges and corners, that must be removed. Considerable expense is incurred in grinding down these excessive build-ups. Still, another factor is that ongoing efforts are directed toward characterizing the fatigue damage due to the electroplating process, and to determine acceptable design stress levels.

Accordingly, it would be generally desirable to provide an improved method of providing a hard-facing coating on a substrate, such as the bore wall of a cylinder, in a manner that would overcome these problems.

DISCLOSURE OF THE INVENTION

With reference to the corresponding parts, portions or surfaces of the disclosed embodiments, merely for purposes of illustration, and not by way of limitation, the present invention provides an improved method of applying a particulate material to a substrate. The improved method broadly comprises the steps of removing impurities from a surface of the substrate; forming a coating composition having a bonding material and at least one particulate material; applying the coating composition to the substrate surface; and creating a diffusion bond between the substrate, bonding material and particulate material for generating a continuous interface between the substrate surface and particulate material such that the change in mechanical properties between the substrate and particulate material occurs in a direction normal to the plane of the substrate surface, thereby minimizing residual strain and coefficient of thermal expansion mismatches between the substrate and particulate material, the surfaces of individual particles of the particulate material being chemically wetted by the bonding material; whereby the particulate material and the bonding material comprise a layer on the substrate surface.

The impurities may be removed from the substrate surface by thermal decomposition, chemical decomposition, electrolytic decomposition, oblation by ions, particularly by high-energy beams, ultrasonically, by fluxing, or by some other unspecified means or method.

The coating composition may be applied to the substrate surface by spraying, dipping, painting, tape-casting, or some other unspecified technique.

The coating composition may include an organic binder, and the particulate material may include a material selected from the group consisting of tungsten carbide (WC), titanium carbide (TIC), vanadium carbide (VC), titanium diboride ($TiB_2$), hafnium carbide (HfC), molybdenum carbide ($Mo_2C$, MoC, $M_3C_2$) chrome boride ($CrB_2$), silicon carbide (SiC), diamond hafnium diboride ($HfB_2$), zirconium carbide (ZrC) and tantalum carbide (TaC).

The mechanical properties between the substrate and the particulate material are preferable in non-abrupt, smooth, continuous transition along a direction normal to the plane of the interface.

The substrate may be Inconel® (a registered trademark of Inco Alloys International, Inc., 3200 Riverside Rive, Huntington, W. Va. 25720, U.S.A.), 15-5 PH stainless steel, or some other material.

Accordingly, the general object of the invention is to provide an improved method of applying a particulate material to a substrate.

Another object is to provide an improved method of applying a hard-facing material to a substrate.

Another object is to provide improved coating compositions for use in such methods.

These and other objects and advantages will become apparent from the foregoing and ongoing written specification, the drawings, and the appended claims.

DESCRIPTION OF THE PREFERRED EMBODIMENTS

Figure 1:
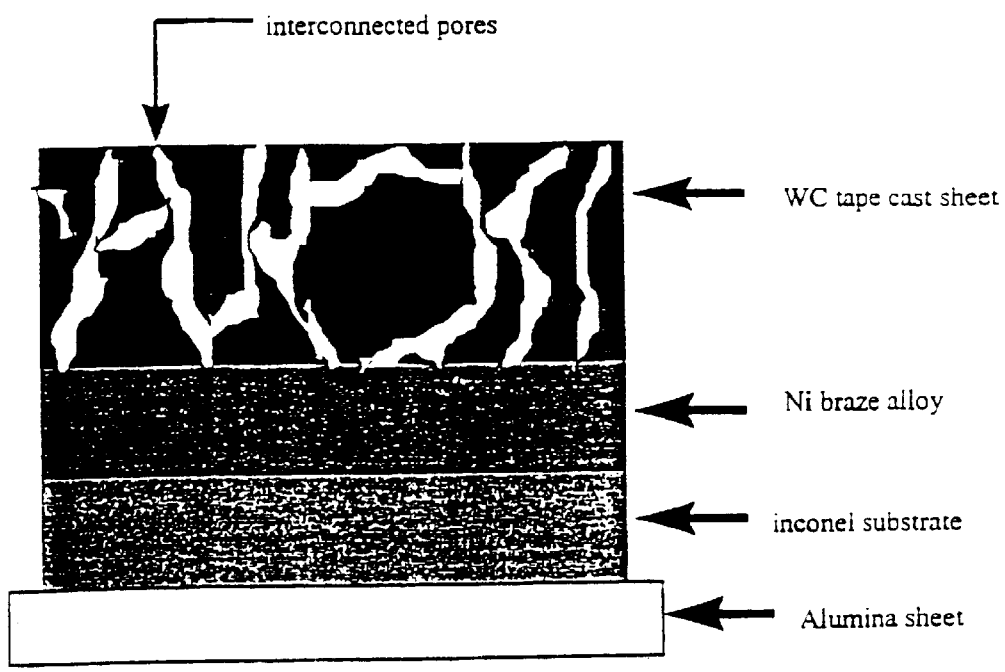
FIG. 1 is a schematic view of a sample arrangement during sinterbonding with the Ni-braze forming the interlayer.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of the invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, equivalent symbols have been used as shorthand expressions of full chemical names.

Powder injection molding ("PIM") is an established manufacturing method for the production of high volume components having complex geometrical forms. The material flexibility, superior mechanical properties, and precision surface finish of PIM make it well suited for many applications. When the complexity of the manufacturing operation does not require this advanced technologies, polymer/powder mixtures can be used in other forming methods.

Binder-assisted forming processes, such as powder injection molding, have focused on operations requiring pressure to fill the die cavity. Other processes, however, have been developed that do not afford the precision provided by injection molding, yet they borrow the concept of binder-assisted forming. Such processes include tape-casting for hard-facing applications, and centrifugal molding for the formation of simple geometric shapes.

Tape-casting was developed to deposit a single, thick layer of tungsten carbide on a superalloy substrate, where the coverage area was in excess 1550 cm$^2$, with a thickness of 2.5 mm. Centrifugal forming was developed to augment a die compaction protocol used to fon-n braze preforms for aircraft engine repair. The die compaction press that was used for the application had a 500,000 kg [550 ton] maximum capacity. Parts being developed by aircraft engine designers would exceed this capacity. Therefore, alternate forming methods were sought. Because this process must be compatible with a currently existing process, the alloy chemistry was fixed. The final goal was to produce a compatible green part having a similar density. The powder preform is composed of a high-melting nickel-based powder and a low-melting nickel-based material.

One objective was to develop a tungsten-carbide-nickel braze composite coating for an Inconel® 600 substrate. The entire project was divided into five stages of research: (a) literature survey, (b) experimental design, (c) tape-cast sheet production, (d) optimization of the bonding process, and (e) evaluation of corrosion and wear properties of the hard-faced material.

BACKGROUND

Tungsten carbide has been extensively exploited in tool industries because of its high hardness and abrasion resistance [Ref. No. 1]. However, processing of tungsten carbide is difficult as it is a refractory material and cannot be densified by solid state sintering at high temperatures. Hence, a binder phase is incorporated in the system to facilitate densification of the material at lower temperatures. The consolidation of the composite is achieved by heating the powders above the melting point of the binder phase. Pressure-assisted sintering is used to obtain fully-densified cemented carbides with high volume fractions of tungsten carbide. The liquid formation temperature should be low enough to avoid the dissolution of tungsten carbide.

The use of the binder phase is not limited to the densification process. The properties of the carbide can be tailored by on the nature and composition of the binder phase [Refs. No. 1,2]. The binder phase affects the toughness, ductility, hardness and abrasion resistance of the composite [Ref. No. 1–3]. The suitability of the binder phase is dictated by the mechanical properties desired for the final cemented carbide.

Conventional cemented carbides often contain cobalt as the binder phase because it satisfies the desired property requirements. The binder imparts the necessary toughness and ductility, and facilitates the production of the cemented carbides at temperatures much lower than the melting point of the carbides [Ref. No. 3]. However, cobalt is strategic material, and is therefore expensive and comparatively rare. Despite early attempts [Ref. No. 4] to find a substitute for cobalt as the binder phase, production has been greatly limited to modeling in laboratory scale.

The major restriction for the use of substitute materials arises from inadequate mechanical property generation. Iron and nickel, in combination with low-melting constituents like boron and silicon, are the major candidate materials for the binder phase. Comparable mechanical properties with the cobalt-cemented carbide were achieved for the Fe/Ni alloy and the alloy in combination with cobalt [Refs. No. 3, 4]. The additional advantage realized was that the binder phase was heat treatable. However, addition of low-melting constituents (e.g., boron) as deemed necessary to facilitate liquid phase sintering at low temperatures.

Aronsson et al. [Ref. No. 1] reported poor distribution of Ni-based binders between the tungsten carbide particles during milling, resulting in poor densification and high porosity levels. Even distribution of the binder is desired to facilitate liquid film formation on binder melting between individual tungsten carbide grains, which enhances densification [Ref. No. 6]. This problem will be more pronounced in the current project at low weight fractions of the binder phase. The presence of agglomerates of binder phase in the initial blend is harmful and has similar effects as poor distribution [Ref. No. 7]. The availability of relatively coarse binder powders will negate this issue. However, the size has to be adjusted to combine with the carbide powder to provide good initial packing densities.

The above section summarized the binder phases which are potential substitutes for cobalt. An advantage of these systems is that they are inexpensive and readily available. The microstructures obtained for the various systems showed excellent bonding between the binder and the carbide phase [Refs. No. 1–5, 10].

Ni-Cr-Mo was investigated by Roebuck et al. [Ref. No. 14] as a replacement for cobalt in tungsten carbide cemented carbides to improve the mechanical properties and oxidation resistance. The presence of Mo conferred improved corrosion resistance, in both acid and alkaline media, together with increased toughness, for a given hardness, in comparison with equivalent tungsten carbide/cobalt cemented carbides. It was observed that Mo partitions to both the tungsten carbide and the binder phase (nickel phase). In an earlier paper [Ref. No. 15], the same authors discussed the use of an infiltration technique to produce tungsten carbide hardmetals with Co and Ni alloy binders. The method involved incorporation of alloy elements into an already-dense cemented carbide by placing the alloy addition on its surface and infiltrating at 1500° C. for 0.5 hr. This way, infiltrated carbides with various compositions for the binder could be generated. The properties required for the binder are similar to those required in liquid phase sintering, i.e., the binder should be liquid and it should wet the carbide at the infiltration temperature. This method was successful in obtaining reasonably homogeneous microstructures of tungsten carbide with various Co and Ni alloys as the binder phase. The binder phases studied included pure Ni, Ni-W-C alloys. $Ni_3Al$, $Al_3Ni$, and alloys with Ni, Co, Cr, Mo, W, C and Al. Table 1 lists the binder composition, the binder content, and the hardness of three such Ni-alloy infiltrated hardmetals.

TABLE 1

Cemented tungsten carbide with nickel-based binder phase.

| Binder-phase composition (wt. %) | | | | | | | Binder Content | Hardness, |
|---|---|---|---|---|---|---|---|---|
| Ni | Co | Cr | Mo | W | C | Al | Ti | wt. % | HV 30 |
| 70 | 15 | 7 | 1 | 2 | 1 | 4 | — | 10 | 1390 |
| 65 | 10 | 15 | — | 2 | 1 | 3 | 4 | 22 | 883 |
| 60 | 20 | 10 | 2 | 2 | 1 | 5 | — | 22 | 869 |

Information on some standard compositions is given in Table 2 for comparison, and also the effect of decreased grain size of tungsten carbide and decreased binder content in increasing hardness.

TABLE 2

Standard cemented tungsten carbide.

| Binder Type | Binder Content, (wt. %) | Tungsten Carbide Grain Size ($\mu$m) | Hardness, HV 30 |
|---|---|---|---|
| Cobalt | 6 | 0.96 | 1540 |
| Cobalt | 6 | 3.2 | 1230 |

TABLE 2-continued

Standard cemented tungsten carbide.

| Binder Type | Binder Content, (wt. %) | Tungsten Carbide Grain Size ($\mu$m) | Hardness, HV 30 |
|---|---|---|---|
| Nickel | 6 | 1.2 | 1495 |
| Nickel | 10 | 1.2 | 1190 |

Roebuck et al. [Ref. No. 15] clearly showed the possibility of producing hardmetals with complex nickel-base alloy binder phases. They detected the presence of gamma prime precipitates (mainly, $Ni_3Al$) in binder phases containing Ni, Cr, and Al. These precipitates are advantageous for mechanical properties. Further, in spite of the high infiltration temperatures, no excessive grain growth of tungsten carbide was seen in samples with highly alloyed binder phases. This signifies that the alloying additions inhibit grain growth, perhaps due to limited solubility of the WC ion in the binder. Aronsson and Pastor [Ref. No. 1] reported that Cr-Ni rich binder phases are often used for good corrosion properties. Further, they reported that compositions similar to nickel-based superalloys have also been tested with satisfactory results.

Nickel-based alloys are used in powder form to enhance wear and corrosion resistance and are applied by various hard-facing techniques [Ref. No. 16]. These alloys typically contain Ni, Cr, B, Si, and often small amounts of C and Fe. Both B and Si form low melting eutectics with nickel or nickel-solid solution. The lower melting point of these alloys over conventional superalloys is an advantage as it eases the processing. Boron and silicon act as deoxidizers and improve the properties of the coating material and in bonding to the substrate, as well as melting temperature depressants for Ni and Cr via the formation of eutectic liquids. Both are expected to diffuse into the substrate during the coating procedures.

Mixtures of the nickel-based alloys (their compositions and melting ranges are presented in Table 3) with tungsten carbide, TiC, and (W,Ti)C were deposited upon steel samples and processed to a coating in a vacuum furnace. They used a relatively high binder content (50–70 wt. %) as the abrasion resistance of the binder in itself was expected to be quite good.

TABLE 3

Nickel-based alloys used for hard-facing carbides on steel.

| | | | | | | | ° C. | |
|---|---|---|---|---|---|---|---|---|
| Alloy | Cr | S | B | Fe | C | Ni | $T_s^a$ | $T_L^a$ |
| HFA1 | 10.0 | 3.0 | 2.25 | 4.25 | 0.45 | bal. | 965 | 1180 |
| HFA2 | 13.5 | 4.25 | 3.0 | 4.75 | 0.75 | bal. | 965 | 1035 |

$^a T_s$ and $T_L$, are the solidus and liquidus temperatures, respectively.

Knotek et al. [Ref. No. 16] attained the best hardness and abrasion resistance at high carbide contents, low processing temperatures, and short hold times at the processing temperatures. With increasing temperatures and the holding times, narrow layers of eta carbides (mainly $Ni_2$, $W_4C$ and traces of $Fe_3W_3C$) formed on the surface of the carbides. Further, Fe from the substrate also diffused into the matrix phase. The formation of the eta carbide layers around the carbide grains caused brittle fracture between the binder and the carbide.

The alloy HFA 2 has a higher B and Si content than HFA 1. This alloy caused more dissolution of carbides and the formation of $Ni_2W_4C$ in comparison to alloy HFA 1. Further, in general for both alloys, the formation of the carbides was accelerated by an increase in processing temperature and time. When mixtures with both the alloys were given the same thermal treatment, large amounts of tungsten carbide remained, and little eta carbide formed in HFA 1. On the other hand, tungsten carbide dissolved almost completely in HFA 2 to form $Ni_2W_4C$.

The wetting between Ni (and nickel-based alloys) and tungsten carbide is extremely good. The contact angle of 0° between the two was attributed to the alloying between tungsten carbide and Ni by Knotek et al. [Ref. No. 16]. Further, they also showed the use of using (W.Ti)C composites in avoiding segregation. Pure tungsten carbide tends to settle downwardly, while pure TiC tends to float.

The presence of carbon is of prime importance in the development of cemented carbides. Insufficient carbon levels lead to the formation of brittle eta phase. The eta phase is a double carbide and its composition depends on the binder phase used (e.g., $Co_3W_3$, C for Co binders, and $Fe_3W_3C$ for iron-based binders). Its presence adversely affects the mechanical properties, and is attributed to its brittle nature. Eta phase formation occurs due to instability of tungsten carbide in presence of low carbon austenite. The tungsten carbide breaks down and reacts with the austenite to form the eta phase. The hardness is maximum for a C content which results only in the formation of tungsten carbide. Excess carbon results in presence of free graphite, which degrades the strength and hardness of the carbide. Moskowitz [Ref. No. 4] found the optimum carbon content to be 4.9% for his Fe/Ni binder system. The desired carbon level can be ascertained by calculating the total carbon, tungsten and iron content from chemical analyses. The presence of Ni reduces the carbon requirement needed to prevent eta formation. The authors associated no reason to this effect but it can be hypothesized that Ni prevents the reaction of the matrix with the carbide. The addition of TaC and VC increases the hardness and the abrasion resistance of the material. Their effects are more pronounced for low binder contents [Ref. Np. 5].

Brazing of a ceramic or a carbide to a substrate using a filler metal is often used for different applications. Information on pertinent brazing operations is included to provide a complete sense of the available techniques and suitable filler materials. In the brazing processes, the differential expansion and contraction between the ceramic and the metal, and the resulting effect on the joint properties, becomes a major concern.

Roberts [Ref. No. 17] presented the criteria necessary to produce satisfactory brazed joints between tungsten carbide (Co-cemented) and steel for application in drilling tools. Brazing was reported to be the preferred method of joining the carbide and its supporting mass of steel. Further, silver-based alloys were reported to be most popular due to their low melting temperatures, excellent wetting characteristics, and good mechanical properties. These alloys generally contain Cu, Zn, Cd, Ni and Mn, and operate at temperatures in the range 640–840° C. Copper-based brazing alloys are also used, considering the high price of silver. These alloys typically contain Cu, Ni, Mn, Si and Zn, and operate at temperatures between 870–1100° C. One of the requirements of the braze filler is that it is of sufficient thickness so that it can absorb the stresses introduced due to the difference in the expansion coefficient of steel and tungsten carbide. A silver-base alloy, Ag71Cu27Ti2, was also used as the filler metal by Chen et al. [Ref. No. 18] to braze $Si_3N_4$ with Inconel® 600. Their work concentrated on the interface between Inconel® and filler metal. The bonding mechanism between the two was attributed to the diffusion of Ag and Cu alloy into the grain boundaries of Inconel® 600 resulting in mechanical anchoring. In another study, Kang et al. [Ref. No. 19] used Au-18% Ni and Ag-28 wt. % Cu as braze alloys, because of their ductility and oxidation resistance, to bond a $Si_3N_4$-based ceramic and a Fe-Ni-Co alloy. The mechanical properties of the brazed joint were reported to be reasonable.

McDermid et al. [Ref. No. 20] performed research enjoining of reaction-bonded SiC to Inconel® 600 for application in advanced heat engines using a nickel-based brazing alloy BNi-5 (Ni-19Cr-10Si). Due to their low melting points, silver- and copper-based braze alloys are unsuitable for such applications considering the high temperatures involved. The authors used both direct brazing and composite interlayer joining. The composite interlayer, consisting of powder mixtures of alpha-SiC and BNi-5, was used to reduce the coefficient of thermal expansion ("CTE") mismatch stresses between the ceramic and the metal, which are generated during cooling. In both methods, the liquid filler metal reacted with the free Si of the reaction-bonded SiC to form a Ni-Si liquid. This liquid, in turn, resulted in the degradation of both the reaction-boned SiC and Inconel® 600. Further, when the composite interlayer was used, the molten filler metal decomposed the alpha-SiC powders to form a Ni-Si liquid which reacted with the reaction bonded SiC and Inconel® 600 layers. Thus, it was concluded that the reaction of the nickel-based braze alloy with the ceramic in this case prohibited its use in joining reaction-bonded SiC and Inconel® 600.

Table 4 summarizes the properties of the various binder phases discussed in the above section.

TABLE 4

| Binder Phase | Binder (wt %) | Final Density, (% theoretical) | Transverse Rupture Strength (GPa) | Abrasion Resistance Factor (cc/rev$^a$ $10^{-3}$) | Fracture toughness (MPa/m$^{2/3}$) | Hardness (kg/mm$^2$) |
|---|---|---|---|---|---|---|
| Fe-10%Ni | 15 | — | — | 8 | — | 91 HRA |
| 316SS | 6 | 96.3% | 1.22 | — | 10.6 | 1458 |
| 316SS | 9 | 96.6% | 1.33 | — | 11.4 | 1398 |
| 60Fe-10Co-30NiMoB | 6 | 96.4% | 1.44 | — | 10.9 | 1439 |
| 60Fe-10Co-30NiMoB | 9 | 97.3% | 1.35 | — | 1.5 | 12.1 |

The sintered properties are affected by the composition of the binder phase which in turn dictates the final microstructures and porosity levels. Iron-nickel alloys serve to reduce the processing temperature and does not react with tungsten carbide. Nickel is essential to stabilize the martensitic phase and to improve the corrosion resistance of the developed carbide [Ref. No. 5]. In addition, the presence of iron makes the binder system heat treatable. Fe-Ni binder inhibits carbide-grain coarsening, resulting in fine-sized grains and producing superior mechanical properties as compared to tungsten carbide-cobalt [Ref. No. 3]. Stainless steel cemented carbides exhibits a finer grain size than Fe-C-NiMoB-based systems. Hence, a higher density is achieved in the stainless steel cemented carbide [Ref. No. 10]. Farooq and Davies [Refs. No. 11, 12] further found that a narrow particle size range of the binder phase improved the final sintered density. The use of stainless steel served to improve the sintered density, mechanical properties and the corrosion resistance of the material. The only drawback was associated with the high sintering temperature requirements [Refs. No. 10–12].

In general, increasing binder content improves the toughness and the transverse rupture strength of the material while decreasing the hardness and the abrasion resistance.

Table 5 lists the properties associated with the modified binder with various alloy additions.

TABLE 5

| Binder Phase | Binder (wt. %) | Final Density | Transverse Rupture Strength (GPA) | Abrasion Resistance Factor (cc/rev$^{-3}$) | Fracture Toughness (MPa/m$^{2/3}$) | Hardness (HRA) |
|---|---|---|---|---|---|---|
| Fe-10%Ni + 4.9%C | 25 | — | 4.2 | 36 | — | |
| Fe-10%Ni + 1% VC | 5 | 96.3% | | 0.52 | | |
| Fe-10%Ni + 1%TaC | 15 | — | — | 14.3 | | 89 |

Vishwandham et al. [Ref. No. 13] made Al additions to Ni-based binder systems. This resulted in the generation of superior properties due to the precipitation of the gamma phase, which provided dispersion hardening to the matrix. Hence, an increase in the hardness and wear resistance was obtained. Prakash et al. [Ref. No. 3] found that the same effect was observed for additions of Mo and Ti to the system. Additions of cobalt to Mo-Fe-Ni systems improved the mechanical properties further by lowering the solubility of Mo in Fe-Ni, thus increasing the amount of dispersed phases. $Mo_2C$ and $Cr_3C_2$ increased the hardness of the cemented carbide by reducing the grain size of the material. A similar effect was observed for VC additions to the binder system [Ref. No. 2].

Design of Experiment

Good interfacial bonding is desired between tungsten carbide and the nickel braze to avoid tungsten carbide pull-outs during actual service of the material. As mentioned earlier, good wettability is the key to the problem. Wettability can be tested by sintering a tungsten carbide-nickel braze mixture compact above the liquids temperature of the braze alloy (where the nickel braze alloy is present as a liquid phase only). Poor wettability results in swelling of the compact, and liquid exuding from the compact. The exuded liquid appears as small spherical balls on the surface of the compact. This processing step helps in isolating the suitable braze alloys for further processing.

A tungsten carbide-nickel braze composite can be developed in two different ways. The first method involves sintering a mixture of tungsten carbide-nickel base mixture above the liquids temperature of the nickel braze to allow for densification of the material in presence of a liquid phase. The limitation with this process is that the effect of relative size and density of the nickel braze and the tungsten carbide becomes prominent during mixing and infiltration. The nickel braze powders are generally available in the coarser size range, as opposed to tungsten carbide which is preferred in finer sizes to enhance the mechanical properties. This can lead to segregation during mixing. More critical are the sintering problems associated with the powder size. On melting, nickel braze may leave behind a large pore (site of its original occupation), and fill up smaller ones. This would lead to poor densification at the completion of the sintering process.

The other method involves fabrication of tungsten carbide-nickel braze composite by selective infiltration of tungsten carbide porous preforms by nickel braze liquid. Nickel braze and tungsten carbide, in the form of tape-cast sheets, are stacked one over the other and sintered above the liquids temperature of the nickel braze. Densification is achieved through capillary, and gravity-induced infiltration of nickel braze liquid into the tungsten carbide sheet. This method is not limited by nickel braze particle size, as it is liquid prior to infiltration. Another advantage with this design is that homogenous composite can be developed by controlling the pore size of the tungsten carbide tape-cast sheet.

Figure 2:
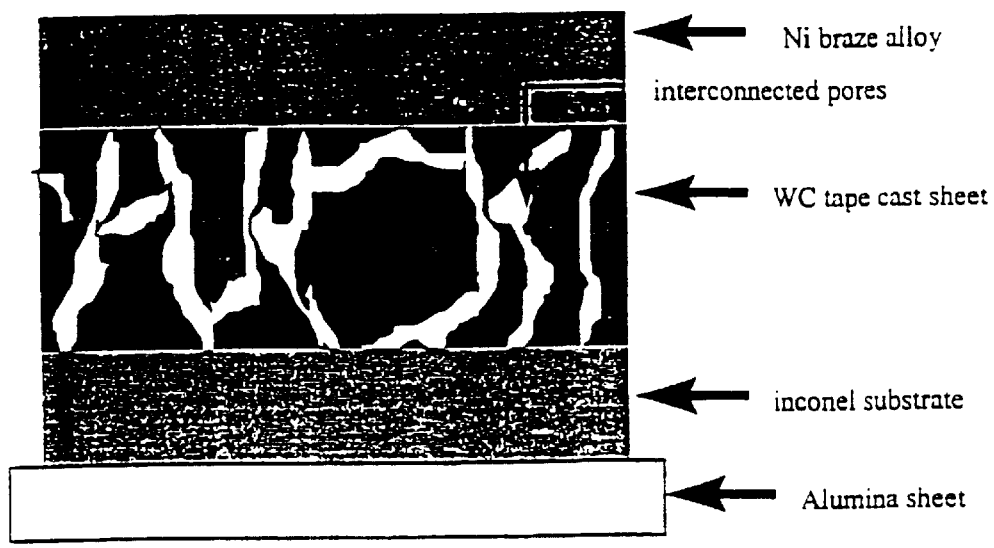
FIG. 2 is a schematic view of a sample arrangement during sinterbonding with the Ni-braze placed at the top.
Figure 3:
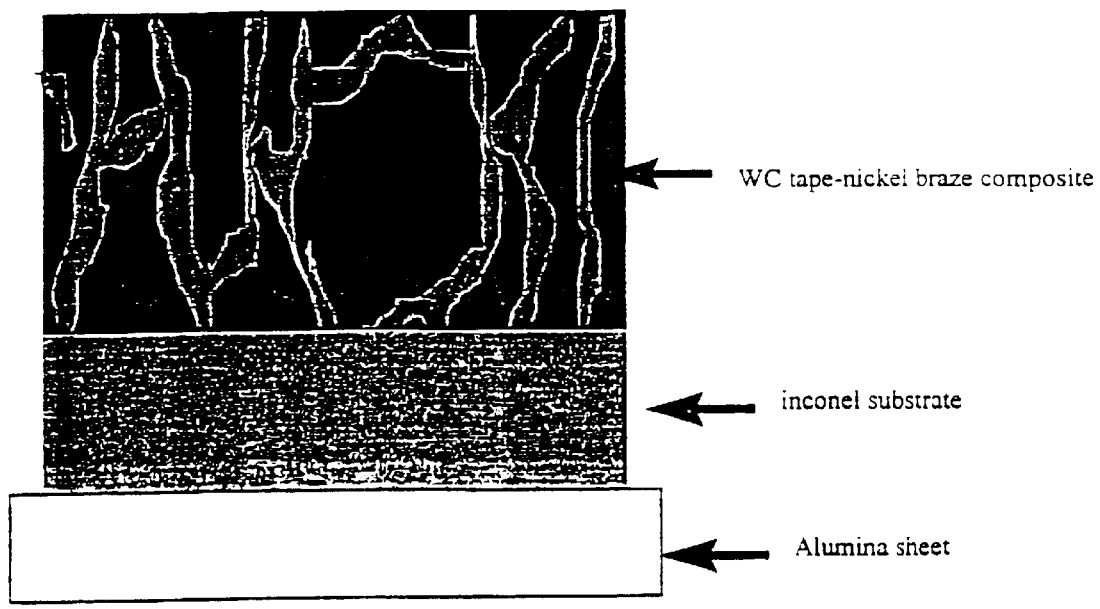
FIG. 3 is a schematic view of a sample arrangement during sinterbonding with a WC-Ni braze composite placed on an Inconel® substrate.
Figure 4:
FIG. 4 is a photomicrograph of the WC powder obtained from Kennametal.
Figure 5:
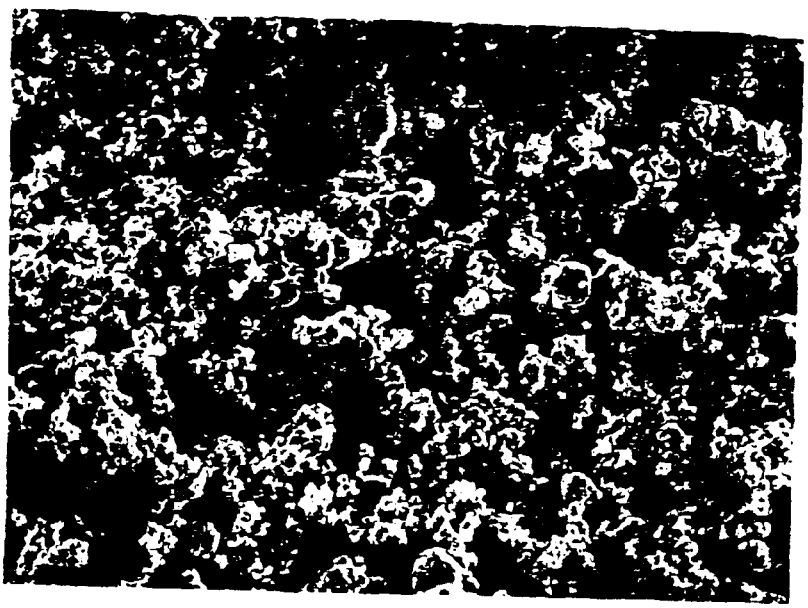
FIG. 5 is a photomicrograph of the WC powder obtained from Ostram and identified as Osram 1.
Figure 6:
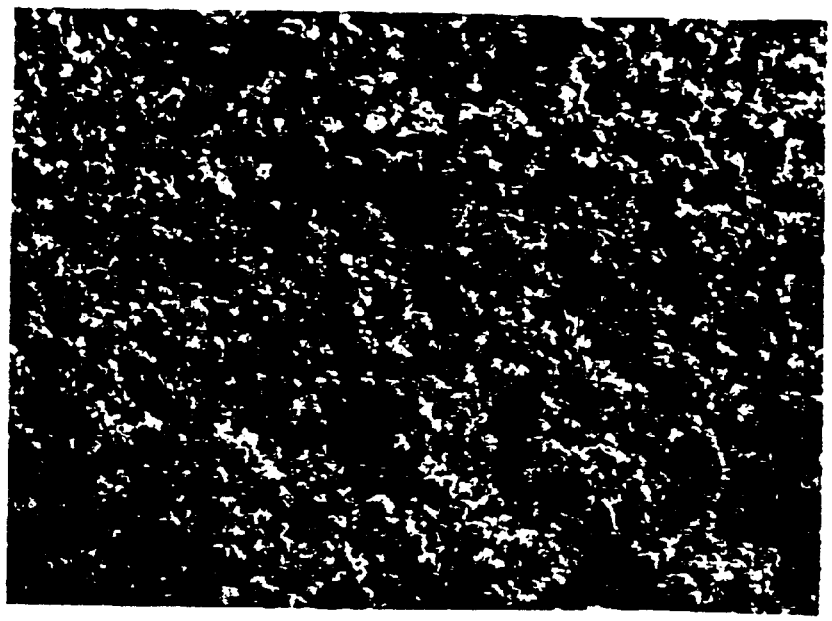
FIG. 6 is a photomicrograph of the WC powder obtained from Osram and identified as Osram 2.
Figure 7:
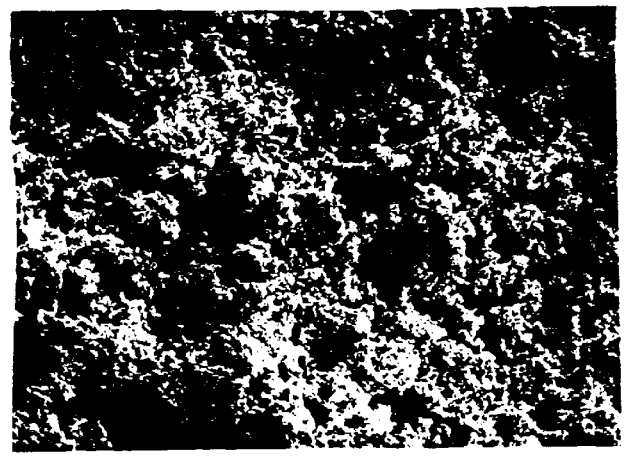
FIG. 7 is a photomicrograph of the WC powder obtained from Dow Chemical Company.
Figure 8:
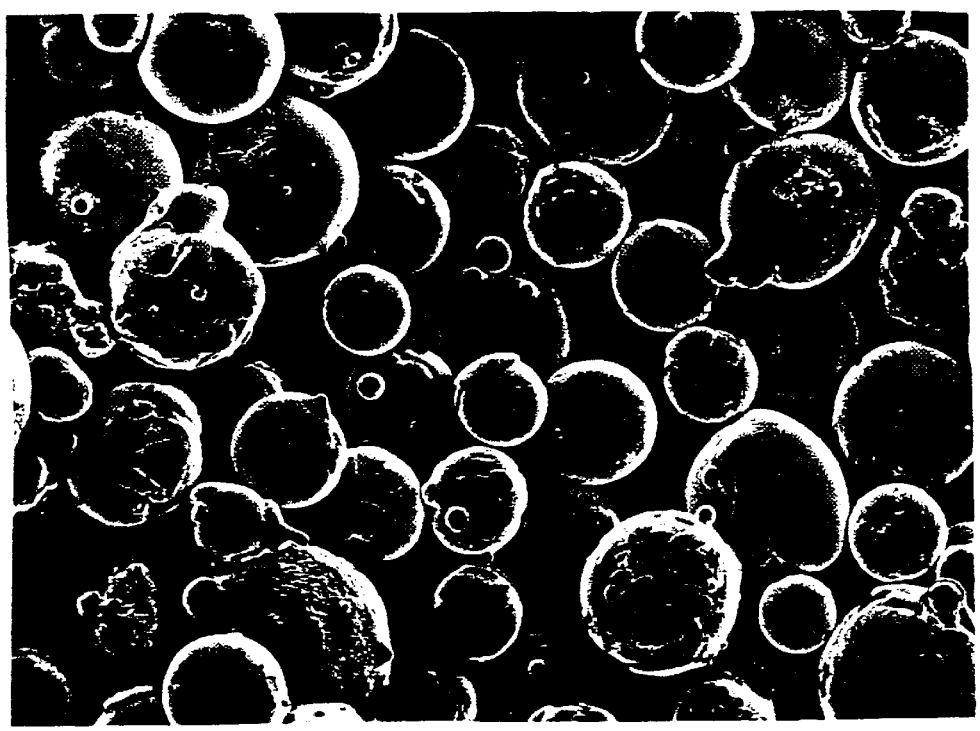
FIG. 8 is a photomicrograph of the Ni-167 braze alloy.
Figure 9:
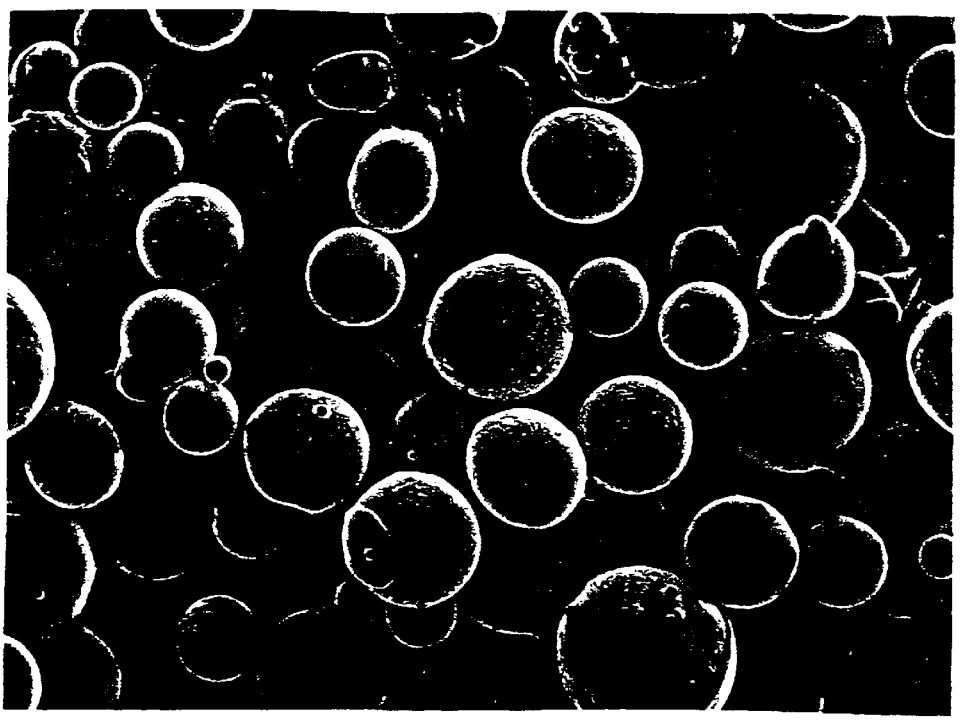
FIG. 9 is a photomicrograph of the Ni-363-2 braze alloy.

The bonding process requires the nickel braze alloy as a cementing agent between the Inconel® substrate and the tungsten carbide. The liquid should be minimized at the interfacial joint between the braze alloy and the substrate to reduce the occurrence of weak regions which can provide for interfacial cracking. Three schematic designs are depicted in FIGS. 1–3. In FIG. 1, a predeveloped tungsten-carbide-nickel braze composite is laid over the Inconel® substrate, and is heated above the nickel braze liquidus temperature. Cementing is achieved through reaction between the nickel braze in the composite and the Inconel®. FIG. 2 depicts the nickel braze as the interlayer, with tungsten carbide at the top and the Inconel® at the bottom. On heating above the liquids temperature, the nickel braze melts, wets the Inconel® and infiltrates the tungsten carbide layer. The limitation with such an arrangement is that the amount of liquid at the interface cannot be controlled. FIG. 3 is an alternate arrangement to the earlier design where the tungsten carbide forms the interlayer with the nickel braze at the top and the Inconel® at the bottom. In this lay-up procedure, gravity aids in the infiltration process and the excess liquid remains at the top. Both the above processes yield the composite and the hard-faced Inconel® in a single operation. The following points need to be noted: (1) the process involves melting of the nickel braze alloy, (2) bonding is achieved through the formation of eutectic liquids between the braze alloy and the Inconel®, and (3) infiltration of nickel braze liquid into tungsten carbide by capillary action and/or gravity.

The development stage involved a sequential analysis of the problem at hand, starting from powder selection to optimizing thermal cycle for the hard-facing process.

The criterion for powder selection includes evaluation of characteristics such as shape, size, density, flowability, compactibility, etc., which characteristics are responsive to the operations carried out on them. Powders of different size range where evaluated for their ease in processing (e.g., production of tape-cast sheet, packing, sintering, etc.). The selection of the Ni-braze powders were based on the melting temperature range and their wettability with respect to WC-powder.

Sample tungsten carbide powders were obtained from Kennametal, Osram Sylvania, and Dow, while the nickel braze alloys were acquired from Praxair and Amdry. The powders were characterized for their size, shape, and densities using standard available equipment. A brief description is given below on each of these processes.

The particle size of the powders was measured using the aerosizer which employs the time of flight of particles to give an equivalent spherical diameter. Table 6 shows the compositions of the two nickel braze alloys.

TABLE 6

| Braze Alloy | Composition |
| --- | --- |
| Ni-167 | Ni-0.8C-4.5Si-14.5Cr-3.3B-4.5Fe |
| Ni-363-2 | Ni-4.2Si-7Cr-3B-3Fe |

Table 7 reports the particle size of the powders. The Osram and Dow contained agglomerates. Data available from the companies indicate the powders to be submicron in size.

TABLE 7

| | Particle Size ($\mu$m) | | | Particle Size Reported ($\mu$m) | |
| --- | --- | --- | --- | --- | --- |
| Powders | $d_{10}$ | $d_{50}$ | $d_{90}$ | $d_{50}$ | Remarks |
| tungsten carbide | | | | | |
| Kennametal | 7.4 | 12.5 | 17.6 | 10 | dispersed |
| Osram-1 | 4.1 | 7.4 | 9.4 | | agglomerated |
| Osram-2 | 1.1 | 1.6 | 2.2 | | agglomerated |
| Dow-1 | 6.6 | 12.9 | 19.0 | 0.8 | agglomerated |
| nickel braze alloy | | | | | |
| Ni-167 | 48.9 | 77.9 | 117.3 | — | coarse |
| Ni-363-2 | 45.2 | 71.2 | 108.5 | — | coarse |

The particle shape was observed under a scanning electron microscope. Photomicrographs of the powders are shown in FIGS. 4–9. The nickel braze powders are spherical in shape as they were gas atomized. The Kennametal tungsten carbide powder has an angular irregular shape. The other tungsten carbide powders were agglomerated due to their fine size. These powders had thermally bonding due to their fabrication technique. The agglomerates can be broken by rod milling or ball milling.

Powder density was measured using a helium pycnometer. This instrument measures the true volume of a powder. By dividing the mass by the measured volume, a density can be calculated. This calculated value should be close to the theoretical density of the powder. Any open pores present are not measured by the system. Pressurized helium is used to measure the volume of pores in a powder of known mass, in a sample container of known volume $V_s$ but unknown powder volume $V_F$. The container is pressurized to a pressure P and then evacuated by allowing the gas to expand in a cell of known volume $V_s$. The drop in pressure is recorded and the ideal gas law is employed to acquire the powder volume, and, hence, the density of the powder. Table 8 reports the pycnometer density of the powders.

TABLE 8

| Powders | Pycnometer Density (g/cm$^3$) |
| --- | --- |
| tungsten carbide | |
| Kennametal | 15.54 |
| Osram-1 | 15.58 |
| Osram-2 | 15.3 |
| Dow-1 | 15.73 |
| nickel braze alloy | |
| Ni-167 | 7.7 |
| Ni-363-2 | 7.95 |

The composite fabrication proceeded through the two methods discussed earlier. The tungsten carbide and the nickel braze powders were mixed together in the first set of experiment. However, though good wettability was observed between the nickel braze and the tungsten carbide, the final density obtained was poor because of poor mixing between the nickel braze and the tungsten carbide and segregation effect due to particle size difference (nickel braze-78 $\mu$m, and tungsten carbide-17 $\mu$m). To enhance good intimate contact between the tungsten carbide and the nickel braze, the powders were rod-milled for a long time (4 hrs) and sintered. Similar density as in case of mixing was obtained. This explained the prominent effect of particle size difference and this method was discontinued for future processing.

The second set of experiments using the simple tape-cast lay-up scheme proved effective and was employed for future experiments. In the following sections, the processing schedules in this part of experiments have been outlayed with emphasis on generation of tape-cast sheet and the important parameters associated with them.

Tape-cast fabrication proceeded through three main stages. The first stage involved the selection of a suitable binder system that was compatible with the powders and yields a flexible homogenous sheet. In the second stage, the composition of the sheet and fabrication routes were considered to allow for maximum solids loading (i.e., volume fraction of tungsten carbide) without sacrificing the flexibility and the uniformity of the sheets. In the final stage, the various mixing routes were investigated in view of the homogeneity of the tape-cast sheet. The following sections briefly discuss each stage individually.

For generation of a tape-cast sheet, the additive system primarily comprises binder, plasticizer, solvent, and a surfactant (if required). The binder provides the necessary bonding between the powder particles which facilitates room temperature handling. The plasticizer is used to induce flexibility in the sheet which allows it to conform to substrates with a slight curvature. Surfactant is added to disperse agglomerates adherent due to weak van der Waal forces or presence of moisture. One important aspect of the additive system is that its residual ash content needs to be low. This becomes more critical for systems, like tungsten carbide, which require close carbon control. An additional criterion specific to this system is the selection of a water-based binder system.

The binder system employed needs to blend in with the tungsten carbide powder to provide for homogeneous tape-cast sheets. Based on the requirements, three binders were finally selected after preliminary testing, which involved hand mixing of the binder system with the powder and checking for flowability of the suspension. In addition, the binders were burned under argon in a thermogravimetric analyzer to record the residual ash content. The binders which were selected after preliminary test were Duramax B-1007, acquired from Rohm and Haas, and Lupasol PS and Lupasol SKA, both obtained from BASF Corporation. The results from the initial evaluation of binders are reported in Table 9.

TABLE 9

| Binder | Vendor | Solids Loading | Molecular Weight | Viscosity (cps) | Mixing Suitability | % Residue | Burnout |
|---|---|---|---|---|---|---|---|
| Duramax | Rohm and Haas | 33% | — | low | poor | 1 | clean |
| Lupasol SKA | BASF | 20% | 2,000,000 | 500–1000 | good | 10 | dirty |
| Lupasol PS | BASF | 33% | 750,000 | 700–2100 | good | 1 | clean-moderate |
| Lupasol water-free | BASF | 99% | 25,000 | 100,000–250,000 | good | 1 | clean-moderate |

Figure 10:
FIG. 10 is a photomicrograph of a tape-case sheet fabricated with Lupasol PS.
Figure 11:
FIG. 11 is a photomicrograph of a tape-cast sheet debound at 650° C. for one hour in a nitrogen atmosphere.

As demonstrated in the above table, Duramax and Lupasol PS demonstrated the best properties for use in the cast sheet fabrication. They have a low residue ash content, indicating a clear burn-out. They also generated uniform tape-cast sheets. FIGS. 10 and 11 show a scanning electron microscope of powder-binder distribution in the tape-cast sheet. The use of Duramax was later discontinued.

Preliminary preparation of tape-cast sheets was carried out using hand mixing. This was done to test for suitability of the binder phase to disperse with the metallic powder. The time required for such operation was essentially long and resulted in non-homogeneous tape-cast sheets. One major problem encountered was formation of air bubble during mixing, which resulted in regions of large pores. This affected the final composite, with the development of isolated liquid pools at these sites.

An alternate and efficient way of mixing is vacuum mixing for preparation of the slurry for tape-casing. This kind of mixing can be carried out in a Whip Mixer™ having a plastic bowl (300 ml capacity) with a paddle mounted on a rotary shaft. The bowl holds the binder-powder system and can be connected to vacuum. The whole mixing process requires about 30–60 seconds and it relieves the mix of air bubbles and other gaseous contaminants. The advantage of such a mixture is two-fold: first, it removes formation of air bubbles during mixing by employing vacuum, and second, the mixing time is greatly reduced to one or two minutes depending on the amount of slurry. The critical issues during mixing are the density difference between the binder and powder, and the viscosity of the binder. Mixing under vacuum results in density separation of the powder and the binder This adversely affects the mixing process, and, hence, formation of a suitable slurry. This problem becomes most prominent for low viscosity binders which do not effectively disperse with the powder during vacuum. Having a low viscosity, Duramax has a tendency to separate under vacuum-induced mixing. This problem was not obvious during hand mixing, and, hence, use of Duramax was subsequently discontinued.

The binder composition used in the creation of tape-cast sheets is listed in Table 10.

TABLE 10

| Additive System | Material | Density (g/cm$^3$) | Remarks |
|---|---|---|---|
| binder | Lupasol PS | 1.03 | clean burn out |
| solvent | water | 1.00 | — |
| plasticizer | dibutyl phthalate (DBP) | 1.04 | (small additions) |
| surfactant | duracan (ammonia dispersing agent) | — | (small additions) |

The composition of the powder-binder mixture in the slurry is shown in Table 11.

TABLE 11

| Material | Solids Loading | Binder | Water | Plasticizer |
|---|---|---|---|---|
| tungsten carbide | 48% vol. | 40% vol. | 5% vol. | 7% vol. |
| Ni braze | 60.7% vol. | 24.9% vol. | 10% vol. | 4.4% vol. |

The casting substrate is of crucial importance as it defines the surface finish and the thickness of the tape-cast sheet. This essentially dictates the surface smoothness of the final composite. The casting surface should have a glassy finish, and should demonstrate poor wettability to the slurry so as to ensure easy release of the sheet on drying. The use of porous substrates aid in drying and also contributes to the increase in solids loading through rearrangement on drying. This greatly reduces the drying time and higher volume fractions of the tungsten carbide can be achieved.

Preliminary studies were carried out using glass substrates, with mounted slides which controlled the tape-cast sheet thickness. The tape-cast sheet had long drying times, and the problem of mold release was evident. Polymer sheets were subsequently used as substrate which solved the mold release problem but the drying time was still extensive. Many porous sheets were investigated to determine their suitability as casting substrates.

Ultracel™ is a concrete material that is reinforced by fiberglass. The substrate was cast at Penn State University using a powder-water mix. The cast material has a smooth surface finish. However, as it is difficult to control, the pore size is non-homogenous. Sheets that were tape-cast on this substrate had reduced drying time, increased solids loading, and a smooth surface finish. The limitation with this substrate is that it demonstrates poor mold release. The reason for this is associated with the large pores present in the ultracel substrate, which sucks in powder along with the water during drying (pore size is greater than powder size). Ultracel also had a tendency to leave a trace on the cast sheet. External impurities cannot be tolerated, as the surface of the sheet needs to be clean for effective bonding. Hence, the use of this substrate had to be discontinued. The next alternative which was investigated for casting was porous alumina substrates. These alumina sheets are commercially available, and are used for slip casting, a variant to the tape-casting process. The alumina sheets are cast similarly to the ultracel, and then presintered to provide sufficient strength to the sheet. This also does not permit any trace marks to be left on the tape-cast sheet on removal. No mold release problem was encountered with the use of this substrate. However, the pore size control is very poor in these sheets, and the presence of large pores was attributed to air bubble formation during its casting. Good pore size control for casting of tungsten carbide tape-cast sheets limits it use.

Hydrophilic polyethylene sheets are commercially available and are polymer sheets with fine-sized pores. The pore size ranges from 15–45 $\mu$m. They have excellent surface finish and close pore size control. As the name itself suggests, the polymer sheets are hydrophilic (i.e., water loving). The polyethylene in itself is hydrophobic (i.e., water hating), and are treated with surfactants to induce hydrophilic characteristics. Being a polymer, the sheet demonstrated good mold release and leaves no trace on the material being cast. Water absorption is practically instantaneous, and, hence, the slurry dries once poured even before it could be cast. This sheet is costly, as compared to the alumina sheet, but provides much better surface finish, pore homogeneity, and good mold release. This substrate was finally selected for casting the tungsten carbide tape-cast sheet.

Table 12 lists summarizes the characteristics of the various substrates used.

TABLE 12

| Substrate | Pore Size | Pore Size Distribution | Nature | Mold Release |
| --- | --- | --- | --- | --- |
| glass | dense | — | none | poor |
| ultracal | coarse | wide | hydrophilic | poor |
| polymer sheet | dense | — | none | good |
| polyethylene | fine (15–45 $\mu$m) | narrow | hydrophilic | good |
| alumina | fine–coarse | wide | hydrophilic | good |

Figure 12:
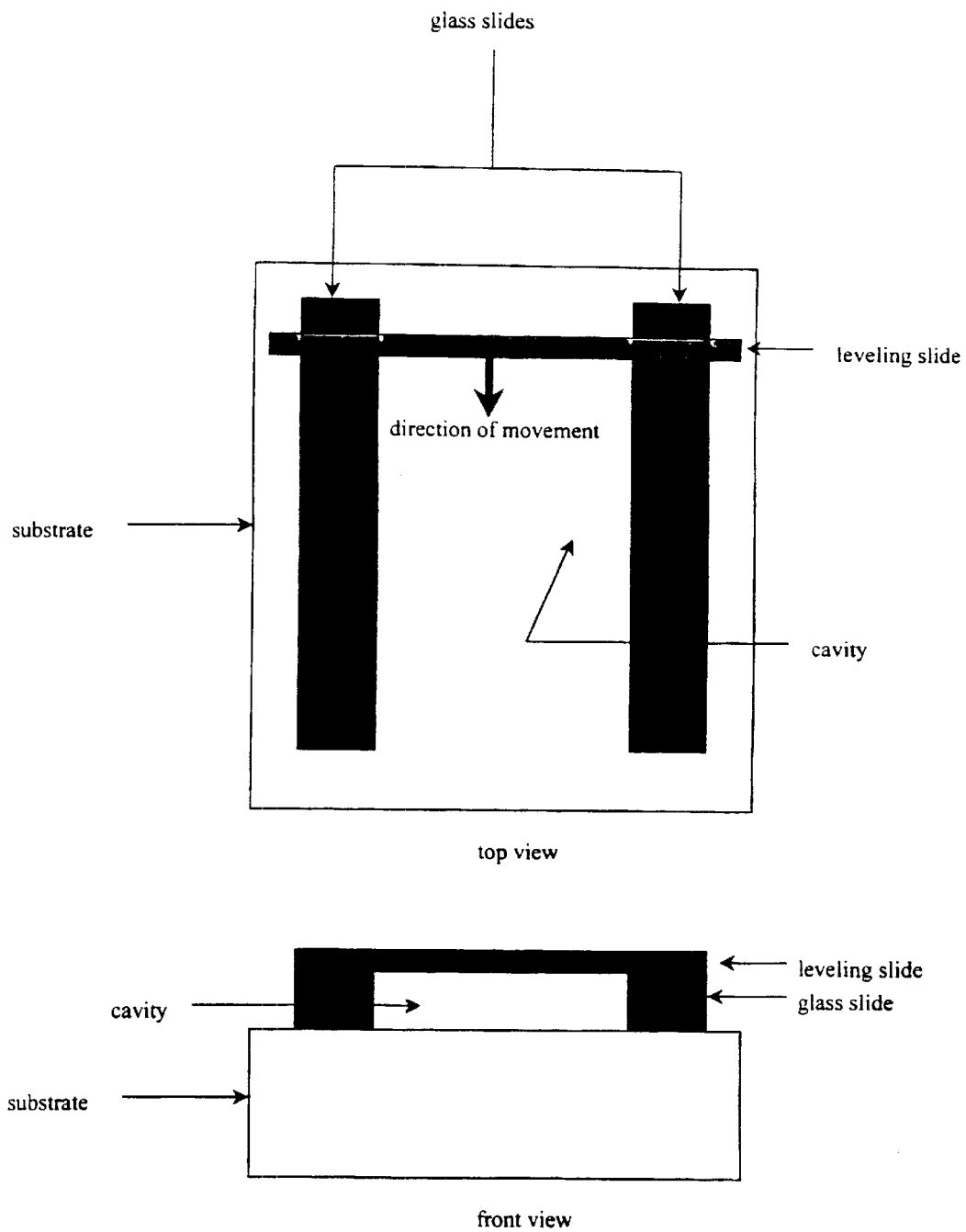
FIG. 12 is a schematic of tape-cast fabrication.

The tape-cast sheet was fabricated on the hydrophilic polyethylene sheet. The thickness of the sheet was controlled by two plexiglass slides which were mounted on the two ends along the width of the substrate and extended parallel along the length direction. This in effect formed a cavity which held the slurry. A doctor blade was run over the slurry while resting on the glass slides mounted on the substrates. The thickness of the sheet was controlled by the thickness of the glass slides, as schematically shown in FIG. 12. To make processing simpler, the hydrophilic sheet is pretreated with water in order to introduce a back pressure while casting the tape-cast sheet. This allows sufficient time for the slurry to be cast without drying. The pores present in the substrate removes water by capillary action and consequently increases the solids loading through particle rearrangement.

The bonding study was the most extensive as the cleaning procedure, thermal cycle, sample layout, and annealing treatment had to be optimized to give a fully-dense tungsten carbide composite and a defect-free interface. This particular section account for the attempts made in this phase of study.

It is critical for the surface of the Inconel® to be free of any oxides or contaminants to ensure poor bonding between the tungsten carbide-nickel braze composite and the Inconel®. The Inconel® was subjected to thermal treatment to burn of any volatile constituents and reduce the oxides. Inconel® was heated at a heating rate of 10° C./min to 1000° C. in hydrogen with a dwell of 1 hour. The temperature was sufficient to reduce any oxides present in the material. After the thermal treatment, the Inconel® was cleaned with acetone prior to the bonding process.

The nickel braze was pre-densified prior to the bonding process. The reason attributed to this is that the nickel braze alloy is very sensitive to impurities, which tend to offset their liquids to high temperatures. The binder present in the tungsten carbide tape-cast sheet tends to penetrate the pores in the nickel braze tape-cast sheets, and offset its melting to higher temperatures. Hence, predensification is desired for proper melting and composite development.

The thermal cycle was optimized in terms of the bonding temperature and time of hold. The bonding temperature was fixed based on the liquids temperature of the nickel braze alloy. The nickel braze alloy demonstrated a melting temperature range of 930–970° C. Superheat was provided to lower the viscosity of the nickel braze, which decreases exponentially with temperature. Based on these requirements the bonding temperature was fixed at 1100° C. The hold time at the bonding temperature is also critical as an optimum limit is required. The time provided should be enough for complete infiltration of the tungsten carbide sheet by the nickel braze liquid. However, the reaction between the Inconel® and the nickel braze liquid should be controlled at the interface to avoid excess liquid formation. The liquid formation due to a eutectic formation between the Inconel® and the nickel braze is diffusion controlled, and the thickness of interface varies as square root of time. Hence, the hold time was optimized.

The sample layout schemes are illustrated in FIGS. 1 and 2. As discussed earlier, by keeping the nickel braze liquid at the top the amount of liquid at the interface could be controlled, and, thence, the amount of reaction with Inconel®. A combination of layout scheme and thermal cycle was employed to arrive at the best bonding conditions which yielded a defect-free interface.

The atmosphere used for the bonding process is very critical as far as the properties of the hard-faced material are concerned. The effects of various atmospheres were evaluated prior to the bonding process. Tungsten carbide contains 6.7% carbon. The use of air or hydrogen as the atmosphere would decarburize the tungsten carbide and seriously impairs its properties. The use of nitrogen, on the one hand, is not feasible either as it would react with the boron in the braze alloy, and trace amounts of oxygen found in the nitrogen have a tendency to oxidize Inconel®. Hence, the use of an inert atmosphere (argon) or vacuum is recommended for such a system. All the experiments in this study were carried out in a vacuum, as high purity inert atmospheres like argon are difficult and costly to obtain.

Bonding Results

Figure 13:
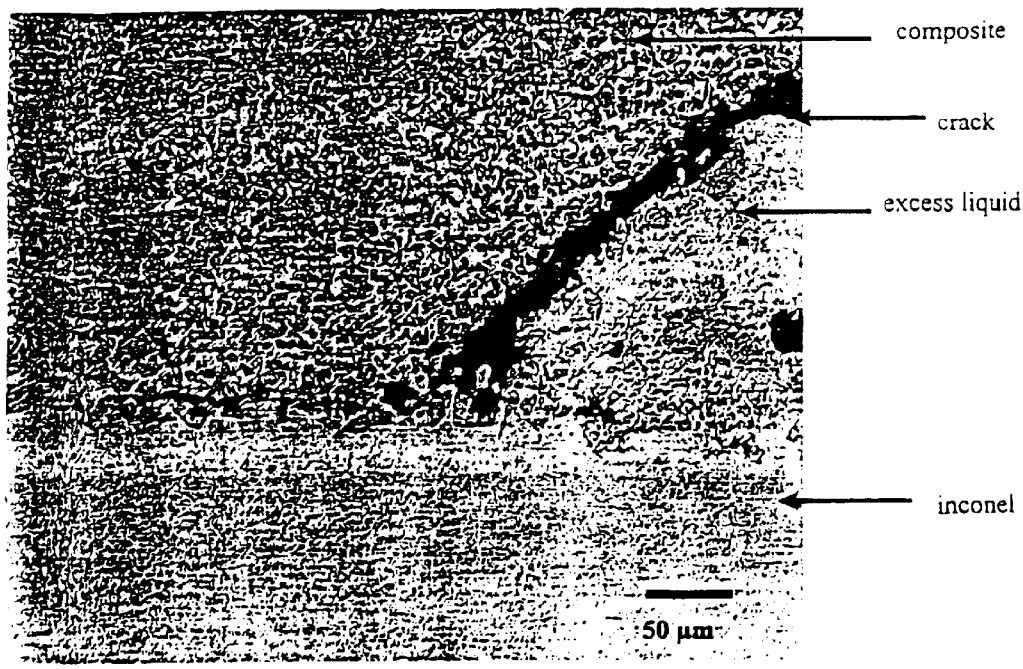
FIG. 13 is a photomicrograph showing the cross-section of a WC-nickel braze composite bonded to an Inconel® substrate.

In the first set of experiments, the Ni braze formed the interlayer as shown in the schematic in FIG. 1. Adjustments in the thermal cycle were made based on the results obtained in the bonding operation. FIG. 13 shows the microstructure of a cross-section of the tungsten carbide-nickel braze composite hard-faced onto Inconel®. The sample was prepared by heating the material at a heating rate of 10° C./min to 1100° C. with a hold for 30 minutes. The sample was subsequently cooled to room temperature. Even though the tungsten carbide-nickel braze composite coating is fully dense, a crack persists throughout the interface. The presence of excess nickel braze liquid at the interface was also observed.

Figure 14:
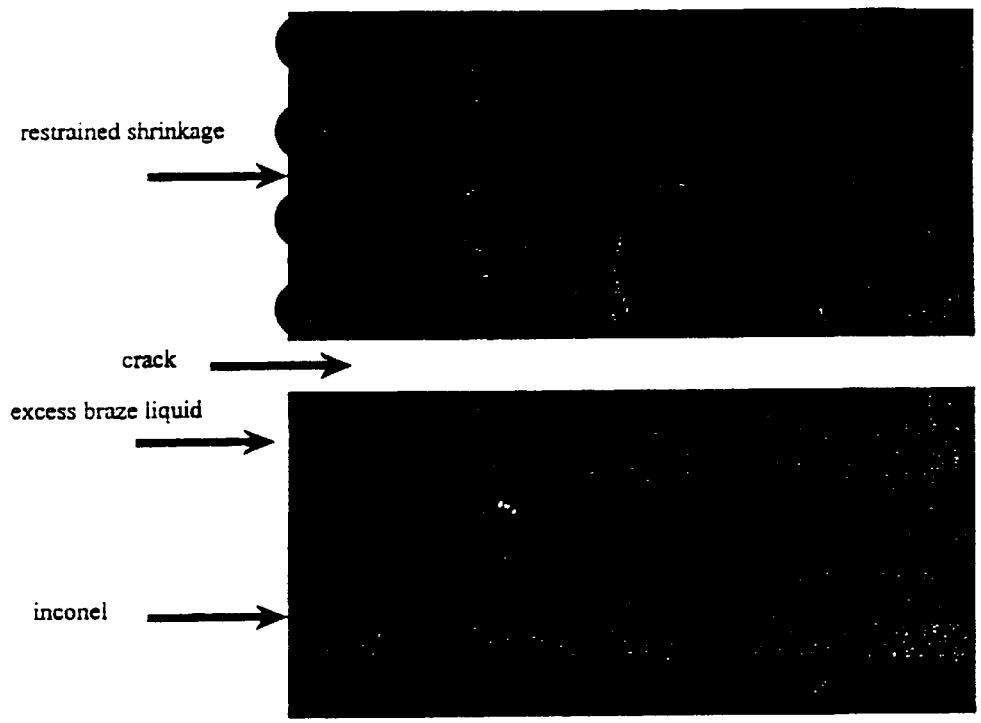
FIG. 14 is a photomicrograph showing interface cracking due to restrained shrinkage.

The excess liquid present at the interface causes the delamination to occur during the cooling operation. During cooling, the tungsten carbide-nickel braze composite, excess liquid, and the Inconel® undergo shrinkage. The shrinkage rate is slower for the coating as compared to the excess limit due to the presence of tungsten carbide. This restricted shrinkage is termed as restrained shrinkage. This influences the crack to occur at the composite coating-excess nickel braze liquid interface and leads to delamination. A schematic of this phenomenon is illustrated in FIG. 14.

Figure 15:
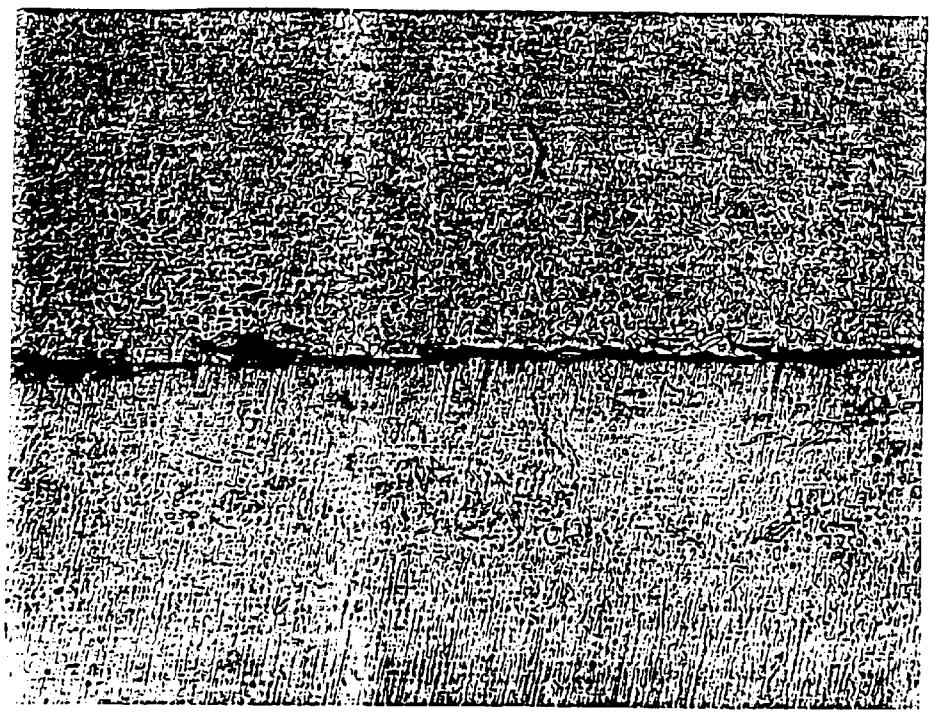
FIG. 15 is a photomicrograph showing a sample in cross-section, and depicting the effect of reducing the hold time.
Figure 16:
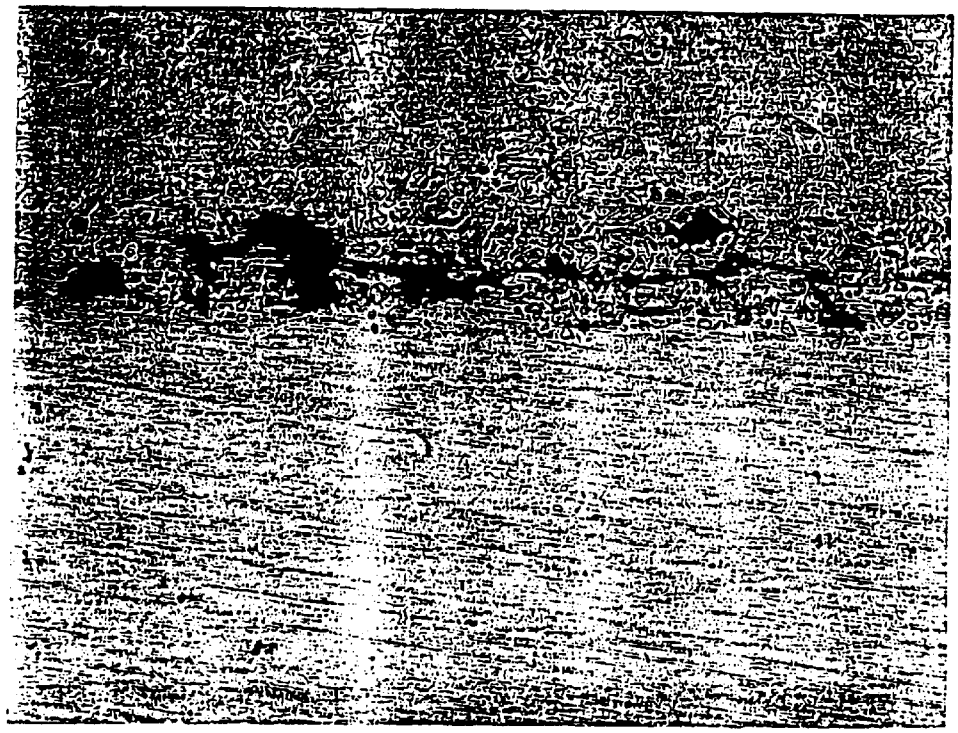
FIG. 16 is a photomicrograph showing a sample in cross-section, and depicting the effect of reducing the cooling rate and the hold time.

In an attempt to reduce the interaction between the nickel braze and Inconel® leading to formation of a eutectic melt, the hold time was reduced. FIG. 15 shows the cross-section of a sample bonded with reduced hold time (i.e., 10 minutes). The amount of excess liquid at the interface decreases, however, it is not sufficient to prevent delamination. The cooling rate was also decreased to 2° C./min to reduce the thermal stress build-up. However, the crack still persisted as shown in FIG. 16. Based on these observations, the layout scheme was changed in order to control the excess liquid at the interface.

The preferred sample arrangement is depicted in FIG. 2. The basic concept behind this kind of arrangement is that any excess liquid which is present subsequent to infiltration is left on top, and can be removed and reused. The nickel braze acts as a liquid reservoir on melting. The infiltration of the nickel braze liquid is aided by capillary forces and gravity. Once full infiltration is achieved, the nickel braze liquid reacts with the Inconel® to provide interfacial bonding. An additional advantage of this kind of arrangement is that, once full infiltration is achieved and the reaction at the interface is initiated, the liquid develops a back pressure which prevents further infiltration of the liquid. This in effect controls the amount of excess liquid at the interface, thus minimizing chances of interfacial cracking.

Figure 17:
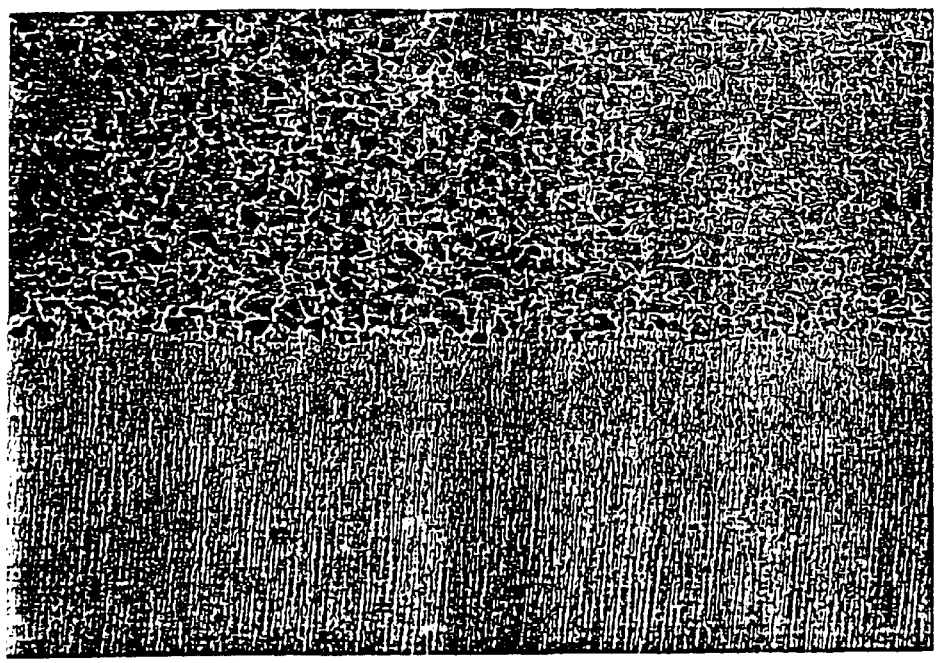
FIG. 17 is a photomicrograph showing a sample in cross-section, and depicting a defect-free interface.
Figure 18:
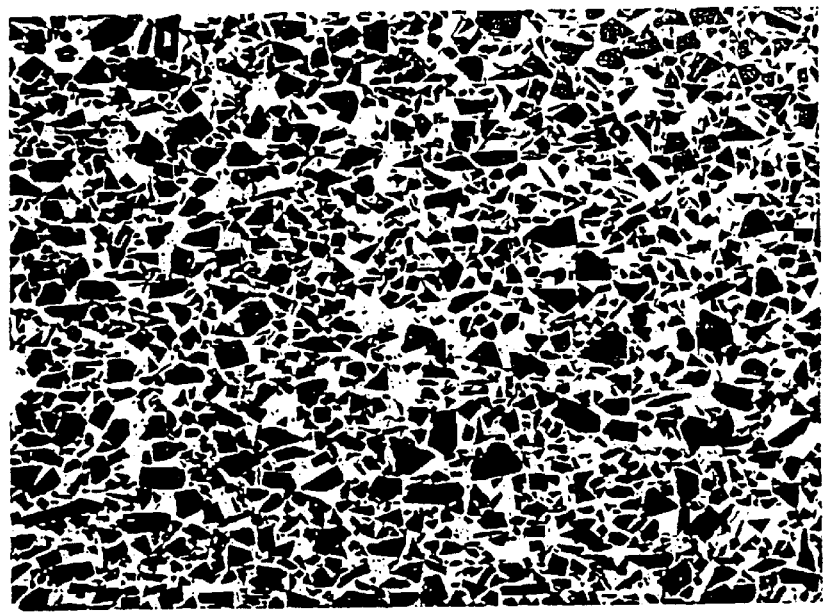
FIG. 18 is a photomicrograph of the WC-nickel braze composite coating on an Inconel® substrate.
Figure 19:
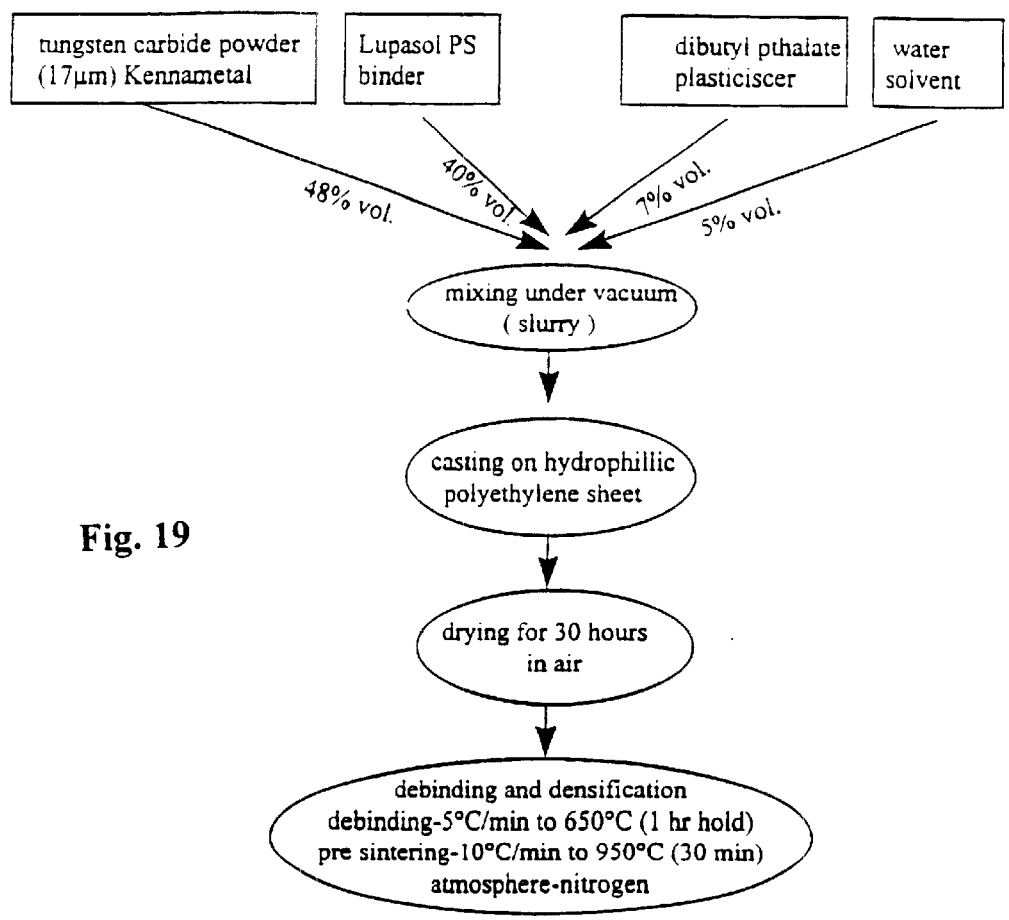
FIG. 19 is a flow chart showing the schematic steps involved in producing WC tape-cast material.
Figure 21:
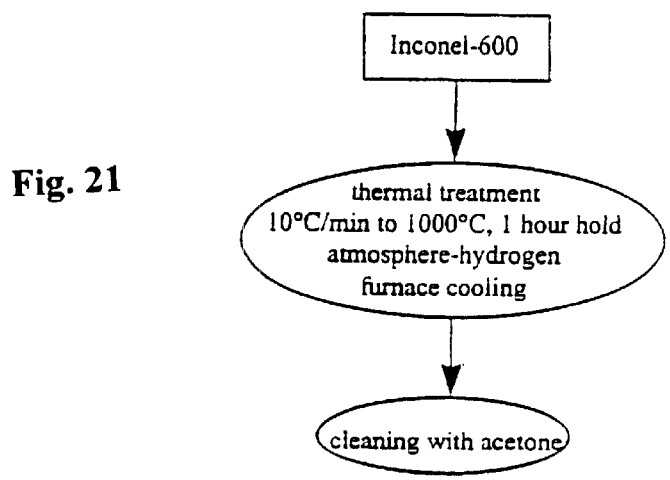
FIG. 21 is a flow chart showing the schematic steps involved in cleaning the substrate prior to application of the coating composition.
Figure 20:
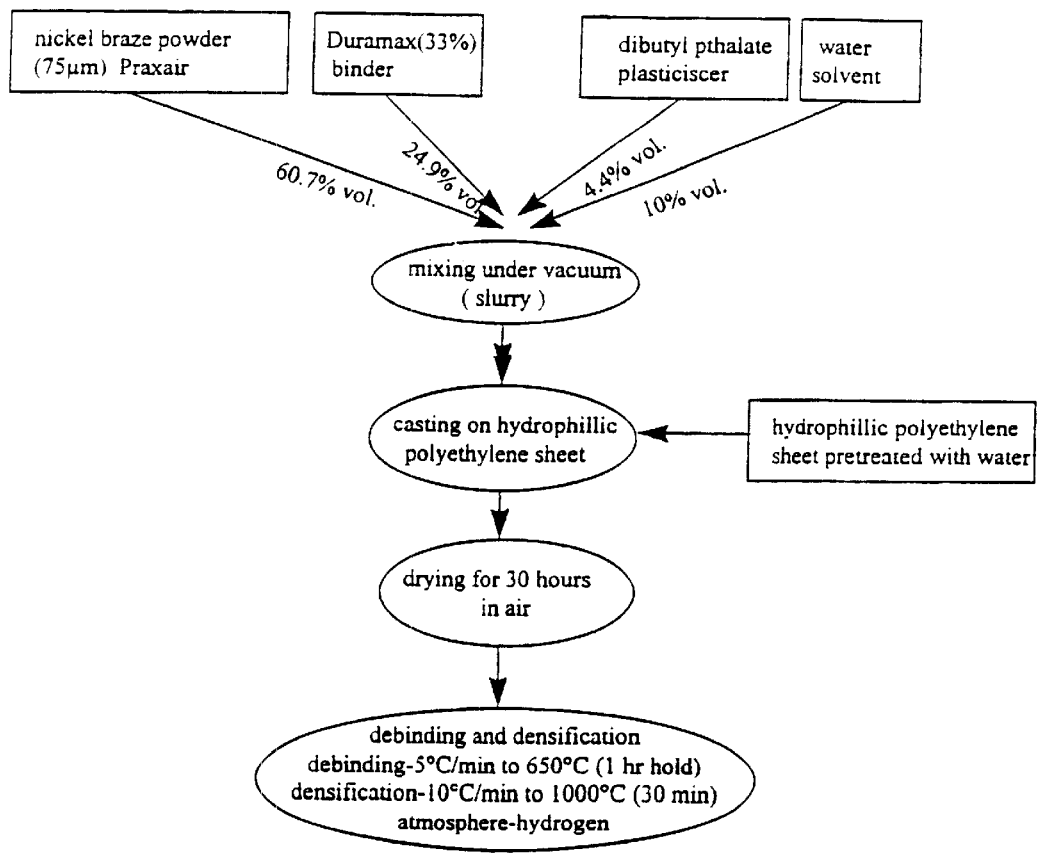
FIG. 20 is a flow chart showing the schematic steps involved in producing predensified nickel braze.
Figure 22:
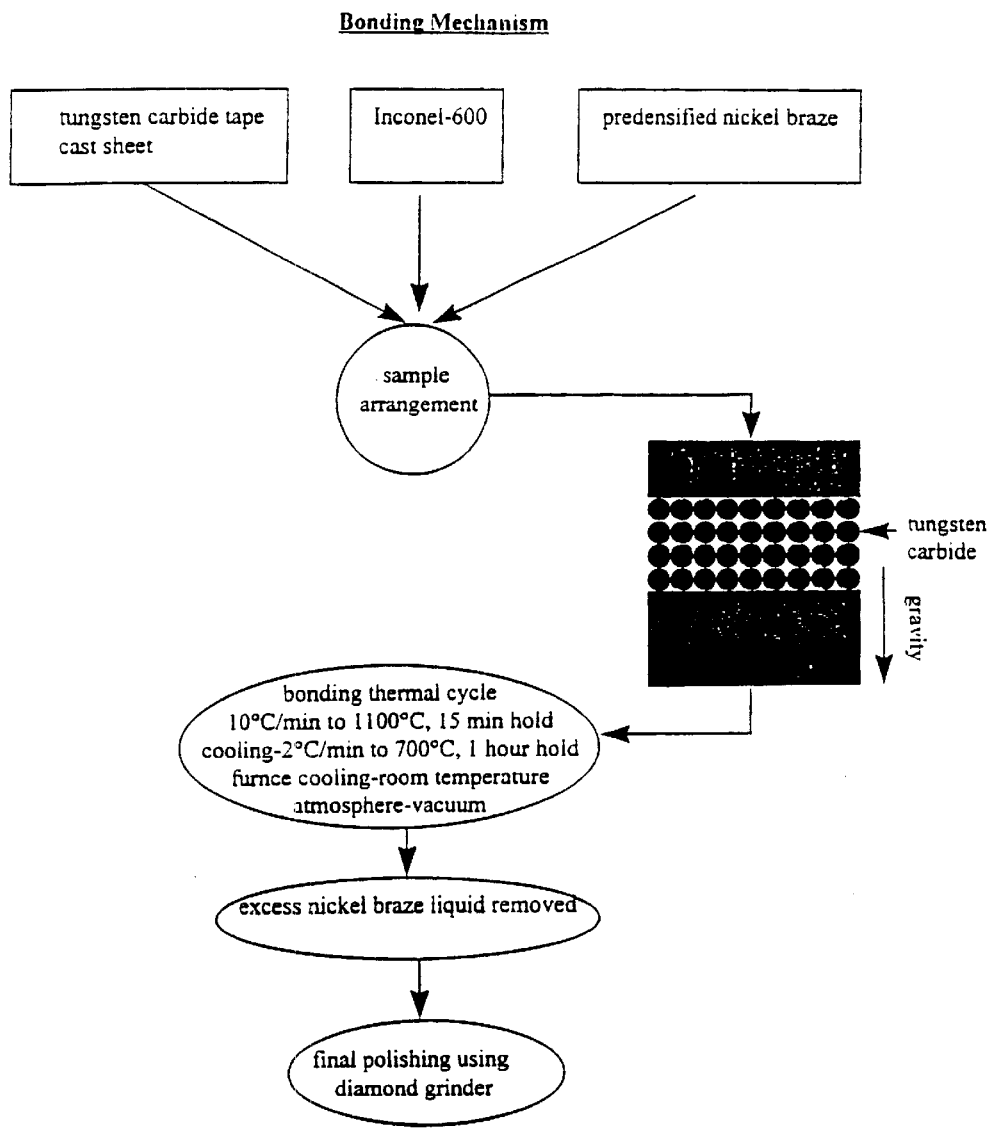
FIG. 22 is a flow chart showing the schematic steps involved in producing WC tape-cast material on an Inconel® 600 substrate.

FIG. 17 demonstrates a sample which was obtained by heating the sample with the above layout. The setup was heated at 10° C./min to 1100° C. in vacuum for 15 minutes. The cooling rate employed was 5° C./min to 700° C. with a hold time of 1 hour. This was essential to provide a stress relieving treatment prior to cooling to room temperature. This was followed by furnace cooling to room temperature. A fully densified composite coating bonded onto Inconel® with a defect-free interface is observed in FIG. 17. The microstructure of the tungsten carbide-nickel braze composite coating is shown in FIG. 18. The final tungsten carbide loading was evaluated using an image analyzer, and is approximately 75% by volume (85% by weight). The maximum thickness of the composite coating after bonding is about 2.286 mm [0.09 inch]. Subsequent to the bonding process, the sample was machined using a diamond grinding wheel. The use of any other wheel is not recommended as it may lead to tungsten carbide pull-outs.

The present project aimed at the production of a tungsten carbide-nickel braze composite coating onto Inconel® 600. An entirely new concept of simultaneous composite development and bonding to Inconel® using pressureless sintering in one single operation was successfully achieved. This process employs the nickel braze liquid as the bonding agent between the Inconel® and the coating as well as a cementing agent for densification of tungsten carbide. The process is commercially viable, and is inexpensive as compared to other hard-facing methods like chemical vapor deposition, laser cladding, high pressure diffusion bonding, etc. The process makes use of infiltration of a tungsten carbide tape-cast sheet which has controlled porosity with nickel braze liquid, and subsequently reaction of the nickel braze with Inconel® to provide interfacial bonding. The bonding process employed a temperature 1100° C. (i.e., above the liquids temperature of nickel braze) with a hold time of 15 minutes in a vacuum. A hold at 700° C. for an hour was provided during the cooling cycle for relieving thermal stresses. This process yielded a fully-dense coating bonded onto Inconel® with a defect-free interface.

References

The following references were referred to in the brackets of the foregoing sections:

| Ref. No. | Title |
| --- | --- |
| 1. | Aronsson and H. Pastor, "Cemented Carbide Powders and Processing", Powder Metallurgy.- An Overview [at pp. 312–330]. |
| 2. | B. Aronsson, "Influence of Processing on Properties of Cemented Carbide", Powder Metallurgy, Vol. 30, No. 3 (1987) [at pp. 175–181 |
| 3. | Prakash, H. Holleck, F. Thummier, and G. E. Spriggs, "Tungsten Carbide Cemented Carbides with Improved Binder Alloys", Towards Improved Performance of Tool Materials, edited by R. S. Irani, E. A. Almond, and F. A. Kirk, The Metals Society, London (1982) [at pp. 118–121]. |
| 4. | D. Moskowitz, M. J. Ford and M. Humenik, JR., "High Strength Tungsten Carbides", International Journal of Powder Metallurgy, Vol. 6, No. 4 (1970). |
| 5. | D. Moskowitz, "Abrasion Resistant Iron-Nickel Tungsten Carbide", Modern Development in Powder Metallurgy, Vol. 10 (1977), pp. 543–551. |
| 6. | R. J. Nelson and D. R. Milner, "Densification Processes in the Tungsten Carbide Cobalt System", Powder Metallurgy, Vol. 15, (1972) [at pp. 347–')63]. |
| 7. | R. F. Snowball and D. R. Milner. "Densification Processes in the Tungsten Carbide-Cobalt System", Powder Metallurgy, Vol. 11, No. 21 (1968) [at pp. 2340]. |
| 8. | R. Warren and M. B. Waldron, "Microstructural Development During the Liquid Phase Sinterin of Cemented Carbides 1. Wettability and Grain Contact", Powder Metallurgy, Vol. 15, No. 30 (1972) [at pp. 166–180]. |
| 9. | R. M. German, Liquid Phase Sintering, Plenum Press, New York (1985). |
| 10. | T. Farooq and T. J. Davies, "Tungsten Carbide Hard Metal Cemented with Ferroalloys", The International Journal of Powder Metallurgy, Vol. 27, No. 4 (1991) [at pp. 347–355]. |
| 11. | T. Farooq and T. J. Davies, "A Study of Alternative Matrices for tungsten carbide Hardmetals." PM Into the '90s-International Conference on Powder Metallurgy, Vol. 2, Institute of Metals, London (1990) [at pp. 388–394]. |
| 12. | T. Farooq and T. J. Davies, "Preparation of Some New Tungsten Carbide Hardmetals." Powder Metallurgy International, Vol. 22, No. 4 (1990) [at pp. 1216]. |
| 13. | R. K. Viswanadham, P. G. Lindquist, and J. A. Peck, "Preparation and Properties of tungsten carbide-(Ni, Al) Cemented Carbides", Science of Hard Materials, edited by R. K. Viswanadham. D. J. Rowcliffe, and J. Gurland, Plenum Press, New York. |
| 14. | B. Roebuck et al., "Partitioning of Molybdenum Between Carbide and Binder Phase in tungsten carbide/Ni cemented carbides infiltrated with Ni-Cr-Mo Alloys", Journal of Material Science Letters, Vol. 5 (1986) [at pp. 473–474]. |
| 15. | B. Roebuck et al., "Infiltration as a Method for Producing tungsten carbide Hardmetals with Co and Ni Alloy Binder-Phases", International Journal of Refractor-j, and Hard Metals, Vol. 3, No. I (1984) [at pp. 35–41]. |
| 16. | O. Knotek et al., "Carbide-Matrix Reactions in Wear Resistant Alloys", Science of Hard Materials, R. K. Vishvanadham et al (eds.), Plenum Press, NY. |
| 17. | P. M. Roberts, "Brazing Cemented Carbide", Metal Construction (Jan. 1987) [at pp. 12–18]. |
| 18. | J. H. Chen et al., "The Metallurgical Behavior During Brazing of Ni-Base Alloy Inconel 600 to Si3N4 with Ag71Cu27Ti2 Filler Metal", Journal of Material Science, Vol. 28 (1993) [at pp. 2933–2942]. |
| 19. | S. Kang et al., "Issues in Ceramic-to-Metal Joining: An Investigation of Brazing a Silicon Nitride-Based Ceramic to a Low-Expansion Superalloy", Ceramic Bulletin, Vol. 68. No 9 (1989) [at pp. 1608–1617]. |
| 20. | J. R. MC'Dermid et al., "The Interaction-of Reaction-Bonded Silicon Carbide and Inconel 600 with a Nickel-Based Brazing Alloy", Metallurgical Transactions, Vol. 20A (Sept. 1989) [at pp. 1803–1810]. |

Modifications

The present invention contemplates that many changes and modifications may be made. For example, the particular substrate material is not limited to Inconel® or 15-5 PH stainless steel. Indeed, the substrate material can be readily changed. Similarly, the coating composition can contain a number of components, such as hard-facing particulate material, a binder, a plasticizer and a solvent. These various ingredients are typically mixed under a vacuum, cast onto a hydrophilic polyethylene sheet, dried for thirty hours in air, and then debinded and densified.

The manner by which the coating composition is applied to the substrate is readily variable, and is not limited to the specific techniques discussed herein.

Therefore, while the preferred steps of practicing the improved method have been shown and described, and several modifications thereof discussed, persons skilled in this art will readily appreciate that various additional changes and modifications may be made without departing from the spirit of the invention, as defined and differentiated by the following claims.

What is claimed is:

1. The method of applying a particular material to a metallic substrate, comprising the steps of:

removing impurities from a surface of said substrate;

forming a coating composition having a braze material and at least one particulate material, said braze material being a nickel braze alloy having a melting temperature of about 930–970° C. and being less than the melting temperature of said particulate material;

applying said coating composition to said substrate surface; and creating a diffusion bond between said substrate and coating composition by sequentially heating said coating composition and substrate to a first temperature above the melting temperature of said braze material but less than the melting temperature of said particulate material, holding said coating composition and substrate at said first temperature for a first period of time, cooling said coating composition and substrate from said first temperature to a second temperature of about 700 degrees C., which is below the melting temperature of said braze material, holding said coating composition and substrate at said second temperature for a second period of time, and then cooling said coating composition and substrate to room temperature, such that substantially no defects are created between said coating composition and substrate when said heated composition and substrate are cooled due to the presence of excess braze liquid degenerated during such heating;

whereby said particulate material and said braze material comprise a layer on said substrate surface.

2. The method as set forth in claim 1 wherein impurities are removed from said substrate surface by thermal decomposition.

3. The method as set forth in claim 1 wherein impurities are chemically removed from said substrate surface.

4. The method as set forth in claim 1 wherein impurities are electrolytically removed from said substrate surface.

5. The method as set forth in claim 1 wherein impurities are removed from said substrate surface by oblation by ions.

6. The method as set forth in claim 1 wherein impurities are removed from said substrate surface by oblation by particles.

7. The method as set forth in claim 1 wherein impurities are removed from said substrate surface by oblation.

8. The method as set forth in claim 1 wherein impurities are ultrasonically removed from said substrate.

9. The method as set forth in claim 1 wherein impurities are removed from said substrate surface by fluxing.

10. The method as set forth in claim 1 wherein said coating composition is applied to said substrate surface by spraying.

11. The method as set forth in claim 1 wherein said coating composition is applied to said substrate surface by dipping said substrate surface into said coating composition.

12. The method as set forth in claim 1 wherein said coating composition is painted onto said substrate surface.

13. The method as set forth in claim 1 wherein said coating composition is applied to said substrate surface by tape-casing.

14. The method as set forth in claim 1 wherein said coating composition includes an organic binder.

15. The method as set forth in claim 1 wherein at least one particulate material is selected from the group consisting of tungsten carbide, titanium carbide, vanadium carbide, titanium diboride, zirconium oxide, hafnium carbide, molybdenum carbide, chrome boride, silicon carbide, diamond, hafnium diboride, zirconium carbide and tantalum carbide.

16. The method as set forth in claim 1 wherein the composition of said coating composition and substrate changes in a continuous manner in a direction normal to said substrate surface in the vicinity of said substrate surface.

17. The method as set forth in claim 1 wherein the composition of said coating composition and substrate changes in a non-abrupt manner in a direction normal to said substrate surface in the vicinity of said substrate surface.

18. The method as set forth in claim 15 wherein said at least one particulate material is tungsten carbide, and wherein the amount of said tungsten carbide in said coating composition after diffusion bonding is about 85% by weight.

19. The method as set forth in claim 1 wherein the thickness of said coating composition after diffusion bond is created is greater than 2.0 millimeters.

20. The method as set forth in claim 1 wherein said first temperature is about 1100° C.

21. The method as set forth in claim 20 wherein said first time is about 15 minutes.

22. The method as set forth in claim 20 wherein said second time is about 1 hour.

23. The method as set forth in claim 1 wherein said substrate and coating composition are heated in a vacuum.

24. The method as set forth in claim 1 wherein said substrate and coating composition are heated in an inert atmosphere.

* * * * *